(12) United States Patent
Ravinel et al.

(10) Patent No.: US 11,060,666 B2
(45) Date of Patent: Jul. 13, 2021

(54) METHOD FOR FILLING TANKS WITH PRESSURIZED GAS

(71) Applicant: L'Air Liquide, Societe Anonyme pour l'Etude et l'Exploitation des Procedes Georges Claude, Paris (FR)

(72) Inventors: Baptiste Ravinel, Grenoble (FR); Julie Flynn, Moirans (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/558,849

(22) PCT Filed: Feb. 24, 2016

(86) PCT No.: PCT/FR2016/050424
§ 371 (c)(1),
(2) Date: Sep. 15, 2017

(87) PCT Pub. No.: WO2016/146912
PCT Pub. Date: Sep. 22, 2016

(65) Prior Publication Data
US 2018/0066799 A1 Mar. 8, 2018

(30) Foreign Application Priority Data

Mar. 17, 2015 (FR) ........................ 1552189

(51) Int. Cl.
*F17C 5/06* (2006.01)
*F17C 7/00* (2006.01)
(Continued)

(52) U.S. Cl.
CPC ................ *F17C 5/06* (2013.01); *F17C 5/007* (2013.01); *F17C 7/00* (2013.01); *F17C 13/025* (2013.01);
(Continued)

(58) Field of Classification Search
CPC .. F17C 5/06; F17C 5/007; F17C 13/04; F17C 2221/012; F17C 2223/0169; F17C 2225/0169; F17C 2205/355
See application file for complete search history.

(56) References Cited

U.S. PATENT DOCUMENTS 5,868,176 A * 2/1999 Barajas ................... F17C 13/02
141/198
2003/0146106 A1* 8/2003 Mitlitsky ................ C25B 15/08
205/637

(Continued)

FOREIGN PATENT DOCUMENTS

EP 2 799 757 11/2014
FR 2 919 375 1/2009
(Continued)

OTHER PUBLICATIONS

International Search Report and Written Opinion for PCT/FR2016/050424, dated May 25, 2016.
(Continued)

*Primary Examiner* — Andrew D Stclair
(74) *Attorney, Agent, or Firm* — Christopher J. Cronin

(57) ABSTRACT

A method for filling tanks with pressurized gas via a filling station comprising at least one source of pressurized gas and a fluid circuit for transferring the gas, comprising a first end linked to the at least one gas source and a second end provided with a transfer line intended to be removably connected to the tanks to be filled, the circuit comprising a first isolation valve, a flow or pressure regulation member, a heat exchanger for cooling the gas transferred to the tank to be filled and a second isolation valve, the method comprising successively filling a first tank then a second separate tank, characterized in that, on completion of the filling of the first tank, the first and second isolation valves are closed to trap a reserve supply of pressurized gas in the circuit (Continued)

between said two valves and in that the reserve supply of gas is used to fill the second tank.

13 Claims, 1 Drawing Sheet

(51) Int. Cl.
*F17C 5/00* (2006.01)
*F17C 13/02* (2006.01)
*F17C 13/04* (2006.01)

(52) U.S. Cl.
CPC ............ *F17C 13/026* (2013.01); *F17C 13/04* (2013.01); *F17C 2205/0142* (2013.01); *F17C 2205/0146* (2013.01); *F17C 2205/0326* (2013.01); *F17C 2205/0332* (2013.01); *F17C 2205/0338* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0157* (2013.01); *F17C 2227/0337* (2013.01); *F17C 2227/043* (2013.01); *F17C 2250/032* (2013.01); *F17C 2250/043* (2013.01); *F17C 2250/0439* (2013.01); *F17C 2250/0491* (2013.01); *F17C 2250/0626* (2013.01); *F17C 2250/0636* (2013.01); *F17C 2250/075* (2013.01); *F17C 2260/025* (2013.01); *F17C 2260/036* (2013.01); *F17C 2265/065* (2013.01); *F17C 2270/0139* (2013.01); *Y02E 60/32* (2013.01)

(56) References Cited

U.S. PATENT DOCUMENTS

| | | | | |
|---|---|---|---|---|
| 2003/0209282 | A1* | 11/2003 | Satou | F17C 5/00 141/97 |
| 2005/0178463 | A1* | 8/2005 | Kountz | F17C 9/02 141/4 |
| 2006/0016512 | A1* | 1/2006 | Takano | F17C 5/007 141/82 |
| 2007/0051423 | A1* | 3/2007 | Handa | F17C 5/00 141/94 |
| 2007/0257043 | A1* | 11/2007 | Kanoya | F17C 5/06 220/581 |
| 2009/0229701 | A1 | 9/2009 | Allidieres et al. | |
| 2010/0193070 | A1* | 8/2010 | Allidieres | F17C 5/06 141/11 |
| 2010/0307636 | A1* | 12/2010 | Uemura | F17C 5/06 141/4 |
| 2012/0227864 | A1* | 9/2012 | Mori | F17C 5/06 141/95 |
| 2014/0263420 | A1 | 9/2014 | Lambrix et al. | |

FOREIGN PATENT DOCUMENTS

| | | |
|---|---|---|
| FR | 2 928 716 | 9/2009 |
| JP | 2007 239 956 | 9/2007 |
| WO | WO 2011/046466 | 4/2011 |
| WO | WO 2011/049466 | 4/2011 |
| WO | WO 2014/082709 | 6/2014 |
| WO | WO 2015 001 208 | 1/2015 |

OTHER PUBLICATIONS

French Search Report and Written Opinion for FR 1 552 189, dated Jan. 8, 2016.
International Search Report and Written Opinion for PCT/FR2016/050425, dated May 17, 2016.
French Search Report and Written Opinion for FR 1552188, dated Jan. 7, 2016.
Anonymous, "Fueling Protocols for Light Duty Gaseous Hydrogen Surface Vehicles," SAE International Surface Vehicle Technical Information Report, (20100300), pp. 1-54, XP055671700.

* cited by examiner

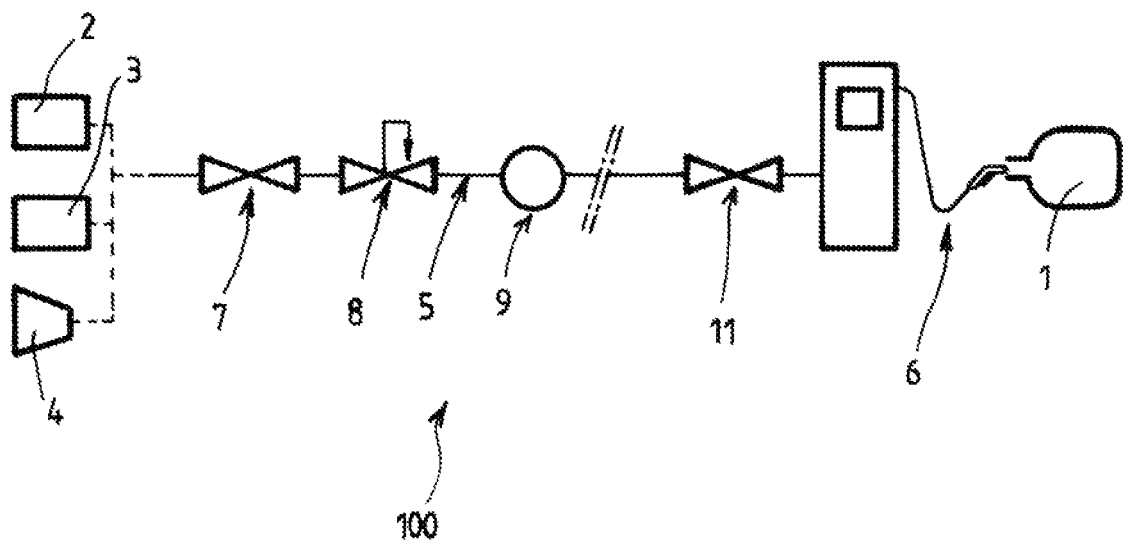

METHOD FOR FILLING TANKS WITH PRESSURIZED GAS

CROSS-REFERENCE TO RELATED APPLICATIONS

This application is a § 371 of International PCT Application PCT/FR2016/050424, filed Feb. 24, 2016, which claims § 119(a) foreign priority to French patent application FR1552189, filed Mar. 17, 2015.

BACKGROUND

Field of the Invention

The present invention relates to a method for filling tanks with pressurized gas.

The invention relates more particularly to a method for filling tanks with pressurized gas, notably pressurized hydrogen, via a filling station comprising at least one source of pressurized gas and a fluidic circuit for transferring the gas from the at least one source to the tanks, the circuit comprising a first end connected to the at least one gas source and a second end equipped with a transfer pipe intended to be connected removably to the tanks for filling, the circuit comprising, arranged in series between the first end and the second end, a first isolation valve, a flow or pressure regulating member, a heat exchanger for cooling the gas transferred to the tank for filling and a second isolation valve, the method involving the successive filling of a first tank and then of a distinct second tank.

The invention advantageously applies to the rapid (in a few minutes) filling of tanks with hydrogen under pressure (of between 200 and 1000 bar for example). The invention notably applies to the filling of vehicle fuel tanks.

Related Art

When a hydrogen tank is being filled with gas under pressure, the compression of the gas in the tank causes heating that may exceed the operational limits of the tank materials. It is thus generally necessary to pre-cool the gas before introducing it into the tank. Document SAE J2601 specifies examples of recommended tank-filing conditions. For that, the filling station needs to be able to supply cooled gas at the target temperature range as quickly as possible as soon as filling is initiated.

In certain situations, the time taken to start up and cool the cooling equipment after a certain standby between the fillings of two vehicles may lead to filling beginning with gas which is insufficiently cold.

The start of the phase of filling of such a tank is, however, critical, because the lines of the filling circuit need to be cooled and a connection test needs in general to be performed, this preferably being performed using a gas that is cold.

Document SAE J2601 also gives recommendations that filling is more advantageous if the lines are cold at the start of filling.

Document WO2011/049466A1 describes the use of a volume of gas available in a pipe for a filling operation.

SUMMARY OF THE INVENTION

It is an object of the present invention to alleviate all or some of the abovementioned disadvantages of the prior art.

To this end, in accordance with the generic definition given thereof in the above preamble, at the end of the filling of the first tank the first and second isolation valves are closed so as to trap a reserve of gas under pressure in the circuit between these two valves, and in that the reserve of gas is used for filling the second tank.

The use of the reserve of gas involves a transfer of gas into the second tank notably via an opening of the second valve.

The present invention proposes an arrangement and use of the lines of the filling circuit that make it possible to improve the start of the filling.

Specifically, at the end of a completed filling, instead of discharging all of the gas present in the lines of the filling circuit downstream of the control member (regulating valve) by discharging it to the atmosphere for example, the invention keeps at least some of this gas cold and under pressure and uses it during the subsequent filling.

What this means to say is that the pressurized gas situated at the downstream end of the line (in the flexible hose connected to the tank for filling, notably downstream of the second valve) is purged in order to allow the downstream end of the flexible hose to be disconnected from the filled tank but the gas situated further upstream between this downstream part and the regulating member (between the second valve 11 and the first valve 7) can be kept and reused.

Moreover, some embodiments of the invention may comprise one or more of the following features:

- the reserve of gas is used to perform a leak test on the second tank connected fluid tightly to the second end of the circuit,
- the reserve of gas is used to perform a leak test of the circuit,
- the reserve of gas is used during a phase of determining at least one physical characteristic of the tank such as its volume, its temperature, its internal pressure, its fill level, said determining phase being performed by injecting gas under pressure from the reserve of gas trapped in the circuit into the second tank and measuring at least one physical parameter of the gas in the tank at the end of injection, the physical parameter of the gas being selected from: the temperature, the pressure within the tank,
- the gas trapped between the two isolation valves is under temperature and pressure conditions corresponding to the last phase of filling of the first tank,
- the gas trapped between the two isolation valves has a pressure comprised between 200 and 1000 bar and preferably comprised between 700 and 900 bar and a temperature comprised between 0° C. and minus 41° C. and preferably comprised between minus 10° C. and minus 30° C.,
- the first isolation valve is arranged in the circuit so that it is adjacent to the heat exchanger, which means to say that the first isolation valve is closer to the heat exchanger than to the first end of the circuit and for preference the first isolation valve is situated at the inlet of the exchanger,
- the second isolation valve is arranged in the circuit so that it is adjacent to the second end of the circuit, which means to say that the second isolation valve is closer to the second end of the circuit than to the heat exchanger,
- the volume of circuit situated between the first and second isolation valves is comprised between 0.00005 m$^3$ and 0.01 m$^3$, or more, for example up to 0.05 m$^3$ or 0.1 m$^3$, or more, for example 1 m$^3$.

the length of circuit between the first and second isolation valves is comprised between one meter and fifty meters and preferably comprised between two and thirty meters, at least between the first and second isolation valves the circuit comprises one or more pipes comprising thermal insulation.

The invention may also relate to any alternative device or method comprising any combination of the features above or below.

BRIEF DESCRIPTION OF THE FIGURES

FIG. 1 is a schematic of an embodiment of the invention.

Other specifics and advantages will become apparent from reading the description hereinafter, given with reference to the single FIGURE which schematically and partially depicts one example of a gas filling station that can implement the invention.

DETAILED DESCRIPTION OF THE INVENTION

The filling station 100 illustrated schematically comprises at least one source 2, 3, 4 of gas under pressure and a fluidic circuit 5 for transferring the gas from the at least one source to the tanks 1 for filling.

The at least one source 2, 3, 4 may for example comprise at least one of the following: a store of pressurized gas or pressurized stores arranged in parallel, one or more compressors, etc. The station 100 may notably use several pressurized tanks in order to perform filling by successive ("cascade") operations of equalizing pressure with the tank for filling (this potentially being supplemented or assisted by a compressor).

Reference may for example be made to documents FR2928716A1 and WO2015001208A2 which describe in greater detail examples of the structure and operation of filling stations.

The circuit 5 comprising at least a first end connected to at least one gas source 2, 3, 4 (upstream side) and a second end (downstream side) equipped with a transfer pipe 6, notably a flexible hose, intended to be connected removably to the tanks 1 for filling.

The circuit 5 comprises, arranged in series from upstream to downstream between the first end and the second end: a first isolation valve 7, a flow or pressure regulating member 8 (expansion valve, flow regulating valve, controlled regulator, valve of proportional type or any other suitable component), a heat exchanger 9 for cooling the gas transferred to the tank 1 for filling and a second isolation valve 11.

The exchanger 9 is a member in which the gas is cooled to the target temperature. Of course it is conceivable to arrange several exchangers with different structures to achieve this cooling.

After the cooling member 9 and the second isolation valve 11, the downstream end of the circuit may in the known way comprise sensors, flexible hoses and connectors for connecting to the tanks 1 of the vehicles for filling.

The schematic depiction in the FIGURE describes a minimum of components. Of course, the circuit 5 may in the conventional way comprise other equipment such as valves, sensors, etc. which may or may not be interposed between the components illustrated in the FIGURE. Likewise, the order of the components may be altered. For example, the first isolation valve 7 may be situated between the regulating member 8 and the exchanger 9 or even downstream of the exchanger 9.

The station may be used as follows.

During a filling of the tank 1 of a first vehicle, referred to as "first tank", the end of the process of filling the tank 1 generally takes place at around about the maximum filling pressure (between 700 bar and 875 bar for example) with a cooling temperature within the recommended ranges (for example between −17° C. and −40° C.). Once the first tank 1 is completely full, the filling station 100 may command the closing of the isolation valves 7, 11 of the distribution line.

The cooling member 9 is preferably switched to a predefined mode of operating conditions awaiting the next vehicle. What that means to say is that a cooling circuit supplying frigories to the exchanger 9 may be switched off or kept at maximum cooing setting or at a cooling setting that is reduced in comparison with its maximum cooling.

In this way, in the phase awaiting the next vehicle, all of the line or lines of the circuit 5 situated between the two isolation valves 7, 11 remain under pressure and at a cooled temperature.

What that means to say is that a reserve of cold and pressurized gas is trapped in the circuit 5 at the conditions of the last few moments (or seconds) of the filling (end of filling).

Thus, when the next vehicle arrives the line of the circuit 5 is kept cold (with the exception of heat losses). The tank 1 of this second vehicle ("second tank" 1) can be filled.

Conventional preliminary tests (prior to the filling in accordance with the recommendations of document SAE J2601 or in accordance with any other filling logic or filling standard specific to each filling station operator) can be carried out using the trapped gas. In particular, the gas can be used to carry out conventional leak tests at a sufficient pressure and also at a cold temperature.

This then makes it possible for the filling of the next tank to begin with a gas that is already cold and under pressure. Likewise, a not-insignificant part of the lines of the circuit 5 is thus already pre-cooled.

This makes it possible to avoid or limit the time needed to start up the cooling system and the preliminary phase in which the exchange between the gas that is to be cooled and the exchanger has not yet stabilized.

It also makes it possible to limit the devices used to prepare gas pre-cooled before filling, such as, for example, keeping the cooling system at its most intensive setting or the presence of a pre-cooling loop in permanent operation.

In the case, for example, of a filling of a first tank 1 which ends after a duration comprised between 3 min and 5 min. At the end of this filling, the isolation valves 7, 11 are closed.

The downstream end of the distribution line (notably flexible hose) connected to the vehicle may be emptied of its gas (downstream of the second isolation valve 11).

By contrast, between the two isolation valves 7, 11, the length of the circuit may typically be comprised between two meters and thirty meters. This portion is thus full of hydrogen for example at a pressure comprised between 700 bar and 875 bar and at a temperature which may typically be between −40° C. and −17° C. This line is preferably lagged. This thermal insulation is designed to minimize heat losses and may allow the effects of the invention to be maximized and prolonged.

After a standby time typically of the order of one to twenty minutes, the gas may have heated up slightly, but remains in a cold temperature range (−40° C. to −17° C. for example).

A second vehicle may arrive at the station 100. The user may carry out the operations of connecting and authenticating his vehicle. Filing is then begun for example by pressing a button or a start indicator.

The first step of filling, for example comprising a leak test and/or a determination of the characteristics of the tank and of the conditions of the filling line, may be performed with the gas contained between the isolation valves 7, 11 (notably via the opening of the second valve 11).

After or during the use of the trapped gas, the process of filling the second tank 11 may continue using pressurized gas coming from the source or sources 2, 3, 4.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising," "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for filling tanks with pressurized gas via a filling station, comprising the steps of:
    providing the filling station, the filling station comprising at least one source of pressurized gas, a cooling circuit, and a fluidic circuit for transferring the gas from the at least one source to the tanks, the fluidic circuit comprising a first end connected to the at least one gas source and a second end equipped with a transfer pipe intended to be connected removably to the tanks for filling, the fluidic circuit comprising, and being arranged in series between the first end and the second end, a first isolation valve, a flow or pressure regulating member, a heat exchanger for cooling the gas transferred to the tank for filling, and a second isolation valve, wherein the cooling circuit provides frigories to the heat exchanger;
    filling a first of the tanks with the pressurized gas while supplying frigories to the heat exchanger with the cooling circuit wherein at the end of the filling of the first tank, the first and second isolation valves are closed so as to trap a reserve of gas under pressure in the fluidic circuit between the first and second isolation valves; and
    after said step of filling the first of the tanks, discontinuing the supply of frigories to the heat exchanger with the cooling circuit and filling a second of the tanks, wherein:
        the trapped reserve of gas is used for filling the second tank via opening of the second valve, and
        between the first and second isolation valves, the fluidic circuit includes one or more pipes comprising thermal insulation.

2. The method of claim 1, wherein the trapped reserve of gas is used to perform a leak test on the second tank connected fluid tightly to the second end of the fluidic circuit.

3. The method of claim 1, wherein the trapped reserve of gas is used to perform a leak test of the fluidic circuit.

4. The method of claim 1, wherein the trapped reserve of gas is used during a phase of determining at least one physical characteristic of the tank selected from a volume of the tank, a temperature of the tank, an internal pressure of the tank, or a fill level of the tank, said determining phase being performed by:
    injecting gas under pressure from the trapped reserve of gas in the fluidic circuit into the second tank; and
    measuring a temperature and/or pressure of the gas in the tank at the end of injection.

5. The method of claim 1, wherein the trapped reserve of gas is under temperature and pressure conditions corresponding to the last phase of filling of the first tank.

6. The method of claim 1, wherein the trapped reserve of gas has a pressure comprised between 200 and 1000 bar and a temperature comprised between 0° C. and minus 41° C.

7. The method of claim 1, wherein the first isolation valve is disposed closer to the heat exchanger than to the first end of the fluidic circuit.

8. The method of claim 7, wherein the first isolation valve is situated at an inlet of the exchanger.

9. The method of claim 1, wherein the second isolation valve is disposed closer to the second end of the fluidic circuit than to the heat exchanger.

10. The method of claim 1, wherein a volume of the fluidic circuit between the first and second isolation valves is between 0.00005 m$^3$ and 0.01 m$^3$.

11. The method of claim 1, wherein a length of the fluidic circuit between the first and second isolation valves is between one meter and fifty meters.

12. The method of claim 1, wherein the trapped reserve of gas has a pressure between 700 and 900 bar and a temperature comprised between minus 10° C. and minus 30° C.

13. The method of claim 1, wherein the pressurized gas is hydrogen.

* * * * *